Jan. 2, 1934.   V. J. BUTTERFIELD   1,941,825
HEATING APPARATUS FOR AUTOMOTIVE VEHICLES
Filed Jan. 23, 1929   3 Sheets-Sheet 1
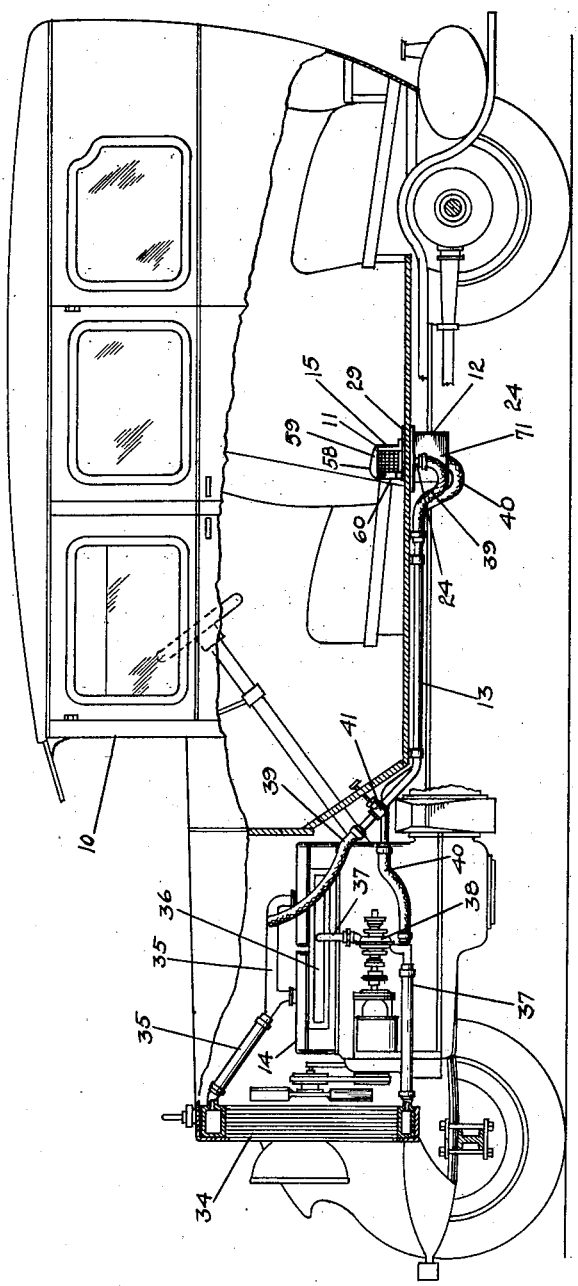
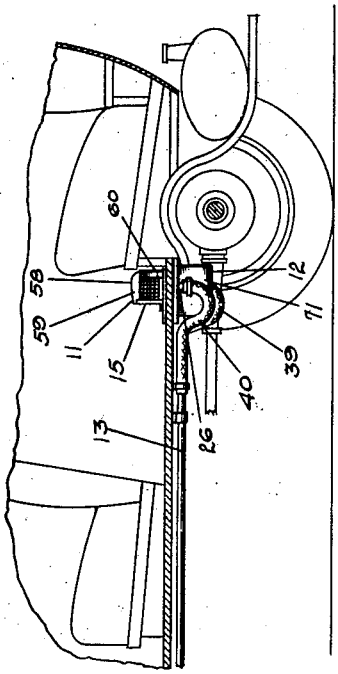
INVENTOR
VERNON J. BUTTERFIELD
ATTORNEYS

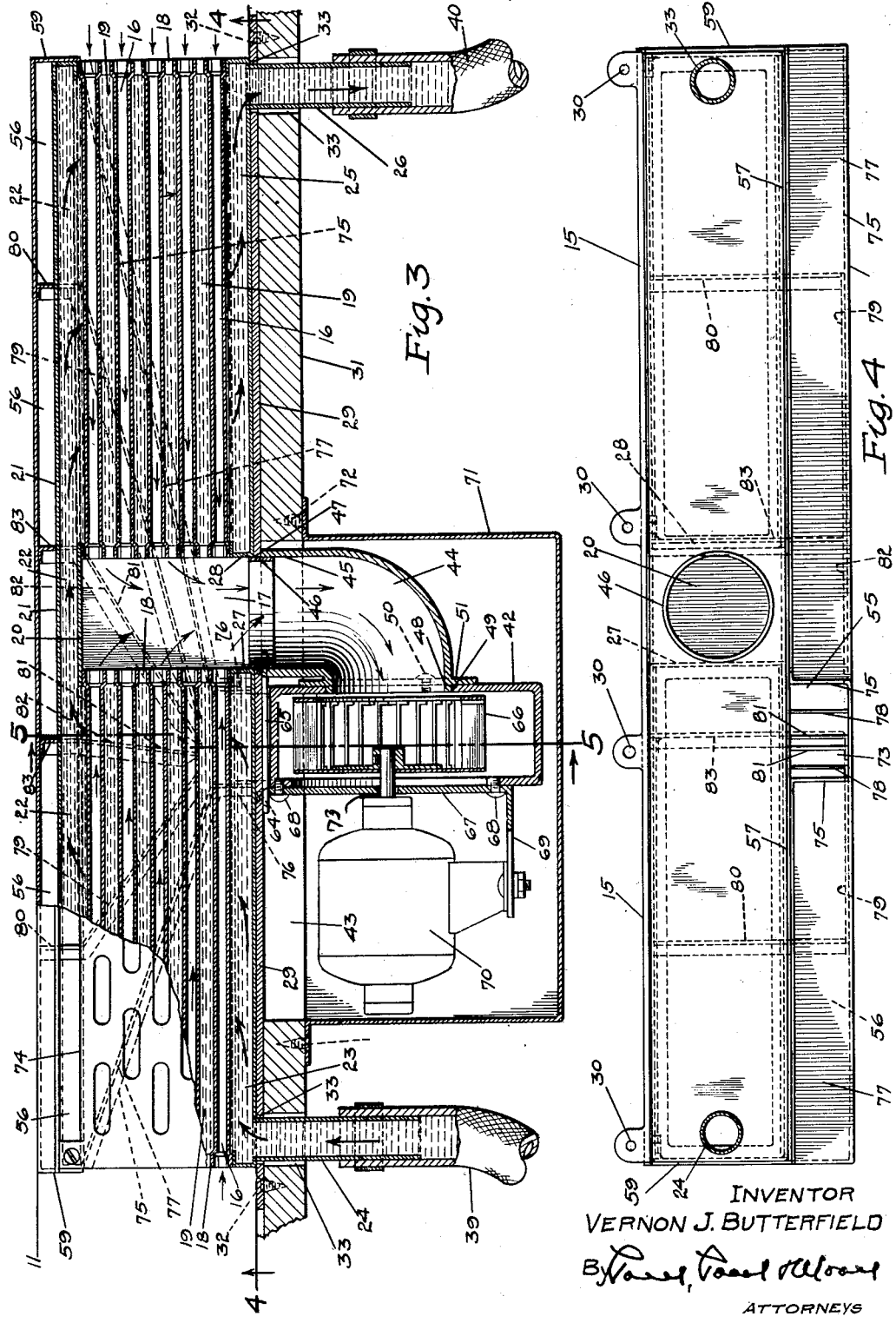

Jan. 2, 1934.  V. J. BUTTERFIELD  1,941,825
HEATING APPARATUS FOR AUTOMOTIVE VEHICLES
Filed Jan. 23, 1929   3 Sheets-Sheet 3
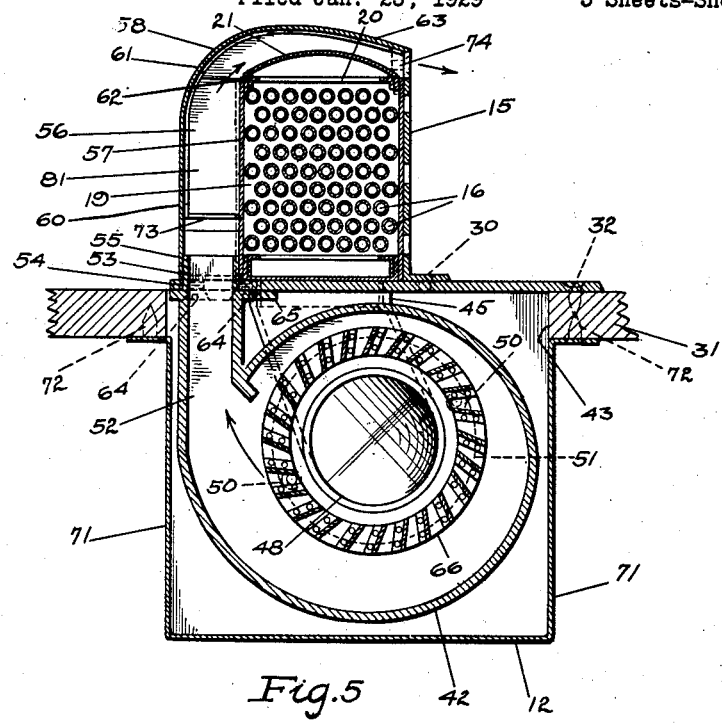
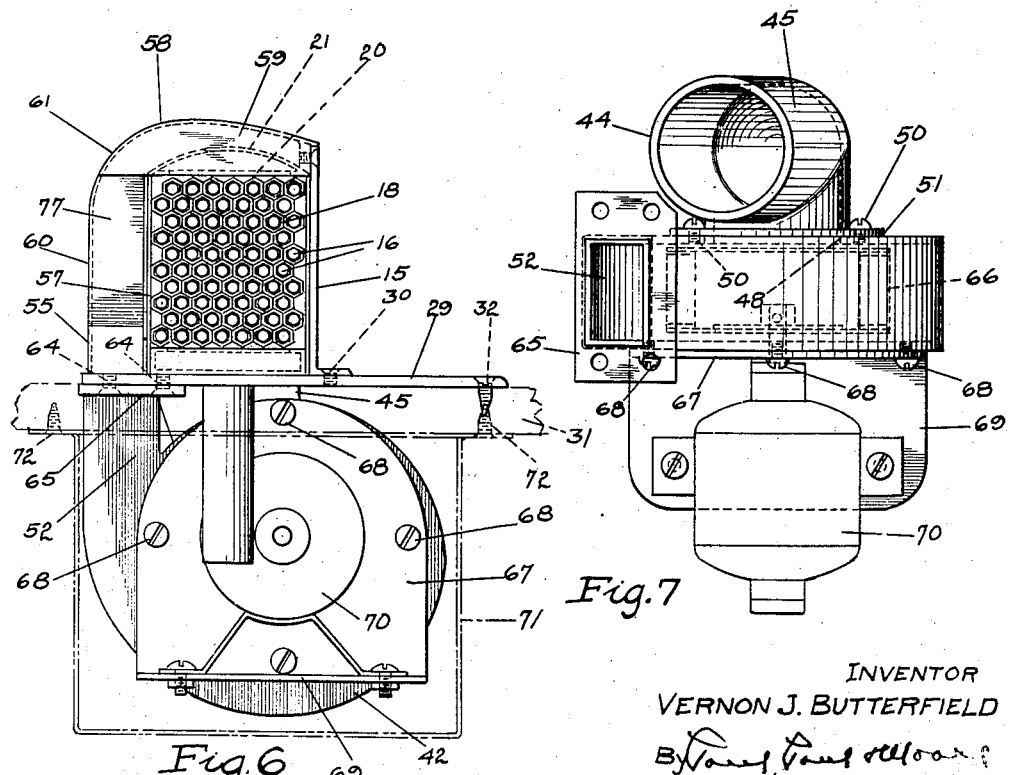
INVENTOR
VERNON J. BUTTERFIELD
ATTORNEYS Patented Jan. 2, 1934

1,941,825

UNITED STATES PATENT OFFICE 1,941,825

HEATING APPARATUS FOR AUTOMOTIVE VEHICLES

Vernon J. Butterfield, Minneapolis, Minn., assignor to Tropic-Aire Incorporated, Minneapolis, Minn., a corporation of Delaware Application January 23, 1929. Serial No. 334,541

8 Claims. (Cl. 257—137)

This invention relates to an apparatus for heating automotive vehicles and has more particular reference to a heater adapted to rest upon the floor of a vehicle body as, for example, in the rear compartment of a taxicab or other passenger automobile.

An object of the invention is to provide an automotive vehicle heater which will include a heating element, more especially adapted to rest upon a vehicle floor, and means, more especially adapted to be situated below the vehicle floor, for forcibly circulating air past the heating element, to thus cause the said air to be continuously heated and circulated within the vehicle body.

A further object is to provide an automotive vehicle heater which will include a heating element, more especially adapted to rest upon a vehicle floor, having a plurality of air-circulating passages surrounded by water-circulating passages adapted to be connected with the usual water-circulating system of the vehicle engine, and means, more especially adapted to be situated below the vehicle floor, for withdrawing air from the interior of the vehicle body through the air-circulating passages of the heating element and for returning the withdrawn air back into the vehicle body interior, to thus cause the said air to be continuously heated and kept in circulation within the vehicle body.

And a still further object is to provide a heating apparatus for an automotive vehicle, including a heating element, an air withdrawing and returning means, and an operative association of the heating element with the air withdrawing and returning means, each and all having novel and improved features and characteristics of construction as now to be fully described, it being understood that the disclosure herein is merely illustrative and intended in no way in a limiting sense, changes in details of construction and arrangement of parts being permissible so long as within the scope of the claims which follow.

In the accompanying drawings forming a part of this specification.

Fig. 1 is a side elevational view, partially sectioned and partially broken away, of an automotive vehicle, disclosing a heating apparatus, made in accordance with the present invention, associated with said vehicle, the heating element of said apparatus being situated upon the front portion of the floor of the rear compartment or tonneau of the vehicle;

Fig. 2 is a fragmentary sectional view of an automotive vehicle having a heating apparatus according to the invention, but disclosing the heating element of the apparatus situated upon the rear portion of the floor of the rear compartment or tonneau of the vehicle;

Fig. 3 is an enlarged vertical, longitudinal sectional view of the heating element and the air-withdrawing and returning means, also disclosing in section the vehicle floor and the connections between the heating element and the vehicle engine water-circulating system;

Fig. 4 is a horizontal sectional view, taken as on line 4—4 in Fig. 3;

Fig. 5 is a vertical, transverse sectional view of the heating element and the air withdrawing and returning means, taken as on line 5—5 in Fig. 3;

Fig. 6 is an end elevational view of the heating element and the air-withdrawing and returning means, as seen from the left in Fig. 3, the box cover for the motor, for the casing of the air blower, and for the hot air inlet to said casing being shown in dotted lines; and Fig. 7 is a top plan view of the unit constituting the air-withdrawing and returning means removed from the heating element.

With respect to the drawings and the numerals of reference thereon, 10 denotes an automotive vehicle equipped with a heating apparatus consisting, generally, of a heating element 11, disclosed as resting upon the vehicle floor, means 12, disclosed as situated below the vehicle floor, for forcibly circulating air through the heating element, and connections 13 between the heating element and the water-circulating system 14 of the vehicle. As shown in Fig. 1, the heating element 11 is situated upon the front portion of the floor of the rear compartment or tonneau of the vehicle, adjacent the front seat. As shown in Fig. 2, said heating element 11 is situated upon the floor at the rear of the rear compartment or tonneau, adjacent the rear seat. The heating element could, evidently, be otherwise situated, as for example, in the front compartment of the vehicle.

The heating element 11 includes a casing 15 housing horizontally disposed air-circulating tubes 16 spaced apart by an air chamber 17 desirably at the midlength of said heating element. The opposite ends of the air-circulating tubes are connected together to provide water-tight joints, as shown at 18 in Fig. 6, and said tubes are spaced apart to provide water-circulating passages 19 therebetween. The inner ends of the air-circulating tubes 16 open to the air chamber 17, and a cover 20 for the air chamber is sealed against the uppermost tubes 16 and against the side walls of the casing 15 to render the upper portion of the air chamber water-tight. A concave cover 21 of said casing 15, in spaced relation to the air chamber cover 20 and the uppermost tubes 16, supplies a water-tight connecting passage 22 between the two sets of spaced apart tubes 16 providing the water-circulating passages 19. A water chamber 23 at the bottom of the casing 15, below the lowermost tubes 16 of one of the sets of tubes, is communicated with by an inlet pipe 24 and communicates with the adjacent water-circulating passages 19, while a water chamber 25 at the bottom of said casing, below the lowermost tubes 16 of the other set of tubes and communicated with by the adjacent water-circulating passages 19, communicates with an outlet pipe 26. Walls 27 and 28 at the inner ends of the water chambers 23 and 25 render the lower portion of the air chamber 17 water-tight. The casing 15 rests upon and is secured to a floor plate 29, as at 30, and the floor plate 29 in turn rests upon and is secured to the vehicle floor 31, as at 32. The inlet and outlet pipes 24 and 26 pass downwardly through apertures 33 in the floor plate and floor. See Figs. 3 to 6. The opposite ends of all of the walls of the casing 15 are suitably sealed against the outermost tubes 16, to render said casing water-tight. See Fig. 6. A grid may extend across the front wall of the casing when this is desirable.

Tubes 16 constructed and arranged as above described, provide unobstructed air-circulating passages through the heating element, leading from the interior of the vehicle body inwardly through each of the tubes of the different sets, to the air chamber 17. Provision is made for causing hot water to flow through the heating element 11, via the inlet pipe 24, the water chamber 23, the adjacent water-circulating passages 19, the connecting passage 22, the adjacent water-circulating passages 19, the water chamber 25, and the outlet pipe 26, so that air entering the air chamber 17 from the vehicle interior via the air-circulating tubes 16 will be heated upon reaching the said air chamber.

Numeral 34 represents the water-cooling radiator of the vehicle engine; 35 denotes a connection between the water jacket 36 of said engine and said radiator; 37 designates a connection between the radiator and the water jacket; and 38 indicates a pump in the connection 37 for forcing a flow of cooling water through the water-circulating system of the engine, from the upper portion of the water jacket via the connection 35 to the radiator and from the radiator via the connection 37 and pump 38 back to the water jacket, in the usual manner. A connection 39 leads from the connection 35 to the inlet pipe 24, and a connection 40 leads from the outlet pipe 26 to a portion of the connection 37 in advance of the water pump 38. An adjustable shut-off valve 41 is situated in the connection 39 as disclosed. By regulation of this shut-off valve, a portion of the water of the water-circulating system can, evidently, be caused to flow from the water jacket via the connection 39 and the intake pipe 24, through the heating element, and back to the water jacket, via the outlet pipe 26, the connection 40, and the pump 38 (in the connection 37). Clearly, an arrangement (such as disclosed in the reissue patent to Caesar, No. 17,131, granted November 13, 1928) adapted to cause all of the water of the water-circulating system to flow through the heating element, could be substituted for the arrangement illustrated and just described. When the shut-off valve 41 is closed, there will be no flow of water through the heating element, as will be obvious.

The air forcing means 12 includes a blower casing 42 situated below an opening 43 in the vehicle floor 31. A hot air inlet 44, leading from the air chamber 17 of the heating element 11 to the blower casing 42, consists of an elbow including a cylindrical upper end portion 45, which is disposed vertically and snugly fits upon an annular flange 46, integral with the casing 15 and extending downwardly through and preferably fitting an opening 47 in the floor plate 29. Desirably, the upper end of the hot air inlet 44 engages a circumference of the lower surface of the floor plate about the annular flange 46. The hot air inlet 44 also includes a cylindrical lower end portion 48, which is disposed horizontally and snugly fits into an opening 49 in the blower casing 42, screws 50, in an annular flange 51 about the lower end portion 48 of the hot air inlet and entering the adjacent wall of the blower casing, may attach the said hot air inlet to the said casing 42. See Fig. 3.

A hot air outlet 52 from the blower casing 42, desirably integral therewith, includes a vertically disposed, rectilinear neck portion 53 which extends upwardly through an opening 54 in the floor plate 29 and snugly fits into the similarly shaped lower end 55 of an air conduit 56 constituted by the rear wall 57 and concave cover wall 21 of the casing 15, a wall 58 in spaced relation to the walls 57 and 21 and extending thereabout, and end closure walls 59 attached to the opposite ends of the said walls 58 and 57, 21. As disclosed, the wall 58 includes a vertical portion 60 parallel with the rear wall 57 of the casing 15, a curvilinear portion 61 encircling the juncture 62 between the walls 57 and 21, and a forwardly extending curvilinear portion 63 desirably slanting gently downward above the concave cover wall 21 of the said casing 15. The casing 42 may be secured to the floor plate 29 by means of screws 64 in a flange 65 about the neck portion 53 and entering the floor plate. See Figs. 5, 6 and 7.

A blower 66, (which is a blower wheel as disclosed), mounted in the casing 42, is adapted to withdraw air from the interior of the vehicle body, via the air-circulating tubes 16, the air chamber 17 and the hot air inlet 44, and to return the heated air back into the vehicle body via the hot air outlet 52 and the air conduit 56. Naturally, the air in passing through the conduit 56, about the heated walls 57 and 21 of the casing 15, receives additional heat, as will be evident. The gently slanting curvilinear portion 63 of the wall 58 of the air conduit 56 directs the heated air slightly downward as it enters the vehicle body, although the arrangement could be otherwise, if considered preferable. See Figs. 3, 5, 6 and 7.

The wall of the casing 42 opposite the hot air inlet 44 is closed by a vertically disposed longer arm 67 of an L-shaped bracket which is attached to the said casing wall as indicated at 68. A horizontally disposed, shorter arm 69 of this bracket supports an electric motor 70. The shaft 72 of the motor passes into the casing 42 through an opening 73 in the arm 67, and the blower 66 is fixed upon the motor shaft. A motor of variant type could be substituted for the electric motor disclosed. See Figs. 3, 4, 6 and 7.

A box cover 71 for the motor 70, the blower casing 42, and the hot air inlet 44, is secured to the lower surface of the vehicle floor as at 72. The box cover can be of heat insulating type when this is considered desirable. See Figs. 1, 2, 3, 5 and 6.

A series of air deflectors 73 are employed to cause all of the air passing from the hot air outlet 52 to the air conduit 56 to travel directly out of the said air conduit to the interior of the vehicle and to be distributed along the full length of the slot 74 of the said air conduit opening to the vehicle body. As disclosed more clearly in Figs. 3, 4 and 5, I have preferred to disclose six spaced apart air deflectors, each disposed across the width of the air conduit and extending upwardly from position adjacent the vertical neck portion 53 of the hot air outlet 52 to the location of the said slot 74, including outermost deflectors 75 each having a vertically disposed, lower portion 76 situated adjacent the neck portion 53, and upwardly extending, diverging portions 77 terminating at the ends of the slot 74, deflectors 78 arranged closer together, between the said outermost deflectors, each having diverging portions 79 extending upwardly from position adjacent the neck portion 53 and terminating in vertically disposed, upper portions 80 arranged at and perpendicular to the slot 74, and innermost deflectors 81, between the deflectors 78, each having diverging portions 82 extending upwardly from position adjacent the neck portion 53 and terminating in vertical portions 83 arranged at and perpendicular to the said slot. Any other preferred arrangement of the air deflectors can be employed, and the deflectors can be fixed in the air conduit 56 in any suitable and convenient manner. It will be apparent that the neck portion 53 will direct all of the air from the blower 66 to position between the outermost deflectors 75, and that the deflectors 78 and 81 will cause the air to be distributed along the length of the slot 74.

Adjustment of the shut-off valve 41, regulates the amount of hot water allowed to flow through the heating element when the pump 38 is operating, and adjustment of the speed of rotation of the blower 66 regulates the amount of air withdrawn from the vehicle body through the air-circulating tubes 16, the air chamber 17 and the hot air inlet 44, and pushed back into the vehicle body through the hot air outlet 52 and the air conduit 56. Evidently, when the blower 66 is in operation, the air within the vehicle body is caused to be continuously circulated, through the heating element 11 and the air forcing or withdrawing and returning means 12, to thus be heated by the hot water flowing through the water passages of the said heating element. When the shut-off valve 41 is closed, so that no hot water is circulating through the heating element, the blower 66 can keep the air within the vehicle body in circulation without heating said air. The rate of circulation of air through the heating element and its air-circulating tubes 16 determines the rate at which heat is absorbed from the hot water flowing through the heating element. When the blower 66 is put out of operation while the valve 41 is open and the pump 38 is operating to froce water through the heating element, but a small amount of heat will be dissipated to the interior of the vehicle body from the heating element.

I claim as my invention:

1. A automotive vehicle heater comprising a heating element positioned within a vehicle body, and air propelling means positoned without said vehicle body for withdrawing air from the interior thereof and for returning the withdrawn air back into the vehicle body interior, the said air propelling means being adapted to cause the said withdrawn and returned air to contact with the heating element both upon its withdrawal from said vehicle body and upon its return thereto, to thus be heated and kept in continuous circulation within the vehicle body.

2. An automotive vehicle heater comprising a heating element positioned upon the floor of a vehicle body, and air propelling means positioned below said vehicle body floor for withdrawing air from the interior of said vehicle body and for returning the withdrawn air back into the vehicle body interior, the said air propelling means being adapted to cause the said withdrawn and returned air to contact with the heating element both upon its withdrawal from said vehicle body and upon its return thereto, to thus be heated and kept in continuous circulation within the vehicle body.

3. The combination with an automotive vehicle, of a heating apparatus comprising a heating element situated within the body of said vehicle, and air propelling means situated without said vehicle body for withdrawing air therefrom and for returning the withdrawn air back into said vehicle body, the said air propelling means being adapted to cause the said withdrawn and returned air to contact with said heating element, to thus be heated and kept in continuous circulation within the vehicle body.

4. In combination, a heating element positioned in a closed body and including spaced apart, air-circulating passages and an air chamber between said passages, and air propelling means for withdrawing air from said closed body through said air-circulating passages and said air chamber and for returning said withdrawn air back into said closed body.

5. In combination, a heating element positioned in a closed body and including spaced apart, air-circulating passages and an air chamber between said passages, a casing having an air propeller, an air inlet from said air chamber to said casing, and an air outlet from said casing to the interior of said closed body.

6. In combination, a heating element positioned in a closed body and including spaced apart, air-circulating passages and an air chamber between said passages, a casing having an air propeller, an air inlet from said air chamber to said casing, an air outlet from said casing, and an air conduit with which said air outlet communicates, said air conduit being disposed in proximity to said air circulating passages and opening to the interior of said closed body.

7. In combination, a heating element adapted to be positioned in a closed body and including spaced apart, encased air-circulating passages leading to an air chamber between said air-circulating passages, and fluid-heating-medium passages about said air circulating passages, means for supplying a hot fluid to said fluid-heating-medium passages, a casing having an air propeller, an air inlet from said air chamber to said casing, an air outlet from said casing, and an air conduit with which said air outlet communicates, said air conduit being situated within said closed body and opening thereto and being disposed at least partially about the said encased air-circulating passages in close proximity thereto.

8. The combination with a heating element including a casing, adapted to be positioned upon the floor of a closed body, housing an air chamber, air-circulating passages leading to said air chamber, and fluid-heating-medium passages about said air circulating passages, of means for supplying a hot fluid to said fluid-heating-medium passages, a casing without said closed body having an air propeller, an air inlet from said air chamber to said air propeller casing, an air outlet from said air propeller casing, and an air conduit with which said air outlet communicates, said air conduit being situated within said closed body and opening thereto and extending at least part way about the casing first mentioned.

VERNON J. BUTTERFIELD.